Jan. 5, 1971          L. M. MAHLER          3,552,036
ECG AND BLOOD PRESSURE SIGNALS SIMULATOR
Filed Nov. 1, 1968                    2 Sheets-Sheet 1
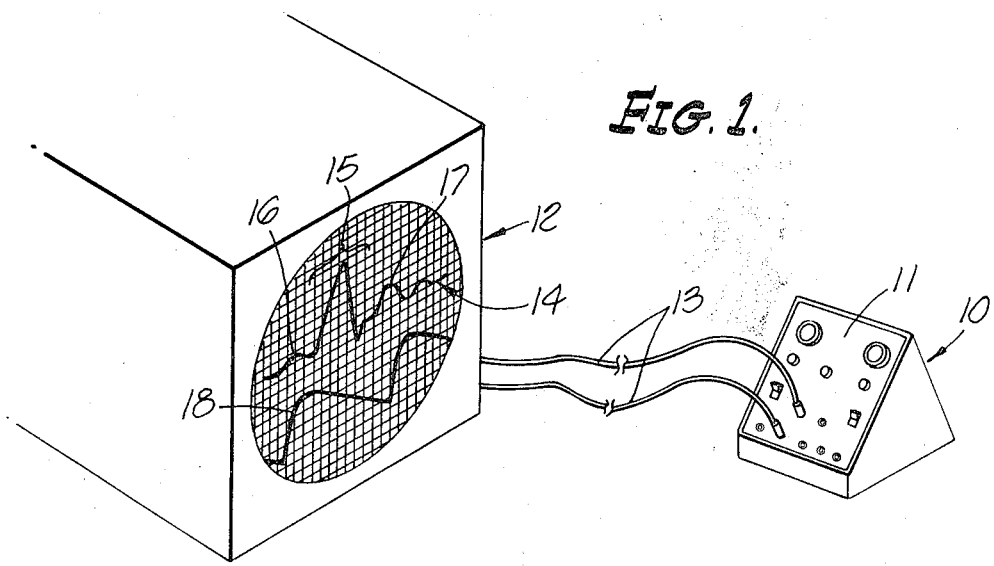
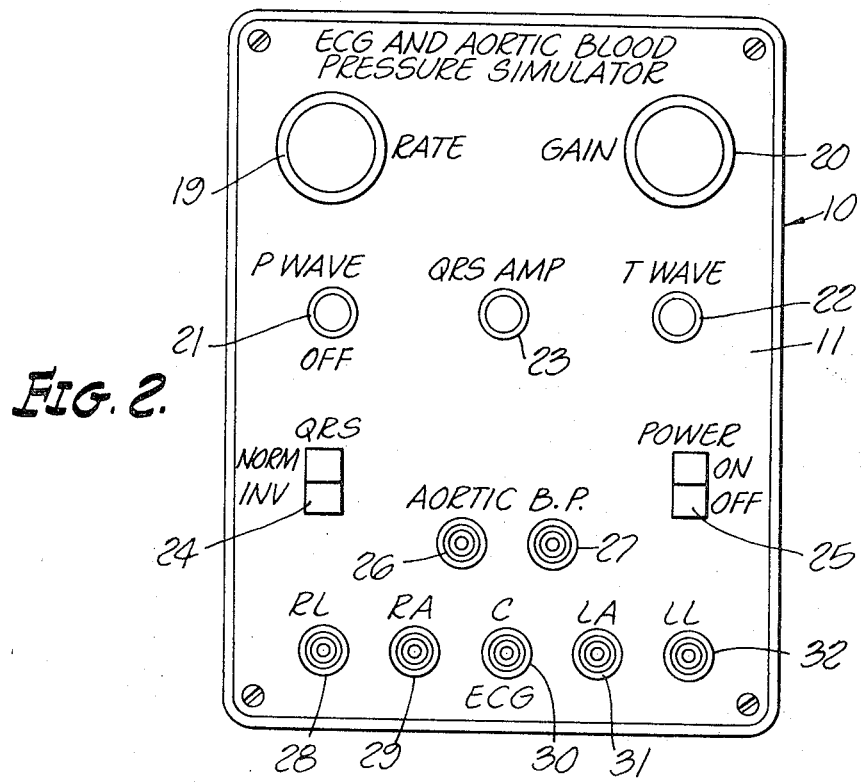
INVENTOR.
LEO M. MAHLER
BY KENDRICK and SUBKOW
*George J. Netter*
ATTORNEYS United States Patent Office 3,552,036
Patented Jan. 5, 1971

3,552,036
ECG AND BLOOD PRESSURE SIGNALS
SIMULATOR
Leo M. Mahler, Ventura County, Calif., assignor to Statham Instruments, Inc., Oxnard, Calif., a corporation of California
Filed Nov. 1, 1968, Ser. No. 772,648
Int. Cl. G09b 9/00
U.S. Cl. 35—17                                                7 Claims

ABSTRACT OF THE DISCLOSURE

Pulse generating and shaping circuits generate a composite output signal simulating an ECG signal for display on cathode-ray presentation equipment. The circuits are selectively controllable to provide the QRS, P and T waves of individually prescribed amplitudes and variable relative locations along the X-axis. The QRS wave may be made to extend either positively in the Y direction, or inverted to extend negatively. A further aspect is the provision of additional pulse signal generating circuitry for producing a pulse train representative of blood pressure as measured within the aorta.

The present invention pertains generally to function generating apparatus and, more particularly, to such apparatus for producing selectively modifiable signals corresponding to ECG and aortic blood pressure.

BACKGROUND OF THE INVENTION

It has been recognized for some time that a significant proportion of heart patients can be saved if there is proper surveillance and treatment. The key difficulty is surveillance, which requires, if to be effective, substantially continuous monitoring of the coronary patients during critical stages of their disease. It is important in such surveillance that any aberrations or arrhythmias be recognized as soon as possible so that proper treatment may be determined and instituted. If this is done, a complete cure may be achieved, or, if not that, the possibility of progression to a more serious type of heart condition can be reduced. Typical equipment used in surveillance of cardiac operation is the so-called electrocardiograph (ECG or EKG), which provides a visual display of an electric signal generated in response to heart action. Also, it is customary to emplant a probe within an artery to determine what is termed aortic blood pressure.

Individuals responsible for monitoring the equipment displaying ECG and aortic blood pressure signals must be able to recognize typical signals as well as the various forms such signals can take as a result of cardiac malfunction. Training of these individuals, usually nurses, in the recognition of various kinds of arrhythmias is therefore of fundamental importance.

Heretofore, apparatus for training individuals in the recognition and analysis of ECG and blood pressure signals has taken the form of rather complex electronic apparatus displaying stored signals taken of actual heart and blood pressure conditions. In such apparatus it is necessary to obtain a tape for each type of cardiac condition regarding which instruction is to be given. Moreover, the equipment needed to make the tapes as well as that for making a visual presentation of the taped material are relatively complex and expensive.

Now, however, in the present invention there is provided circuit apparatus selectively controllable to provide simulated ECG and blood pressure signals that may be monitored on an oscilloscope or other cathode-ray tube type of presentation. The signals can be adjusted to any desired shape, either to correspond to that typically expected for various age, sex and physical conditions, as well as to represent specific cardiac conditions. Also, the apparatus of the present invention permits modification of a simulated ECG signal to make it appear as if it were taken at different parts of a patient's anatomy, such as left leg, right leg, arm or the like. In this manner, a considerable amount of flexibility is provided in the instructional aspects of the equipment. For example, by simple manipulation of control knobs of the present invention, the student is immediately apprised of the effect on the ECG and blood pressure signals of change of some physiological aspect. Still further, not only can the Q wave amplitude of the ECG signal be modified individually, maintaining the P and T waves in a fixed condition, but also, the P and T waves themselves can be modified both as to relative amplitudes and location on the abscissa relative to each other and the QRS wave.

SUMMARY OF THE INVENTION
AND DRAWINGS

Wave shaping circuitry is provided for producing a simulated ECG signal with QRS, P and T waves having selectively variable characteristics. The QRS wave may be displayed in the normal upwardly extending condition or inverted and the P and T pulses may be positioned on the X-axis to any desired location. A resistance summing circuit having multiple output terminals provides individual signal sources representative of an ECG taken from various portions of the human anatomy.

A further aspect is the provision of a circuit for generating pulses representative of signals provided by blood pressure sensors emplanted within an artery.

FIG. 1 is a perspective view of the apparatus of the invention shown connected to a cathode-ray presentation device.

FIG. 2 is an elevational view greatly enlarged of the apparatus of the invention particularly illustrating the control panel.

DESCRIPTION OF A PREFERRED EMBODIMENT

Figure 3:
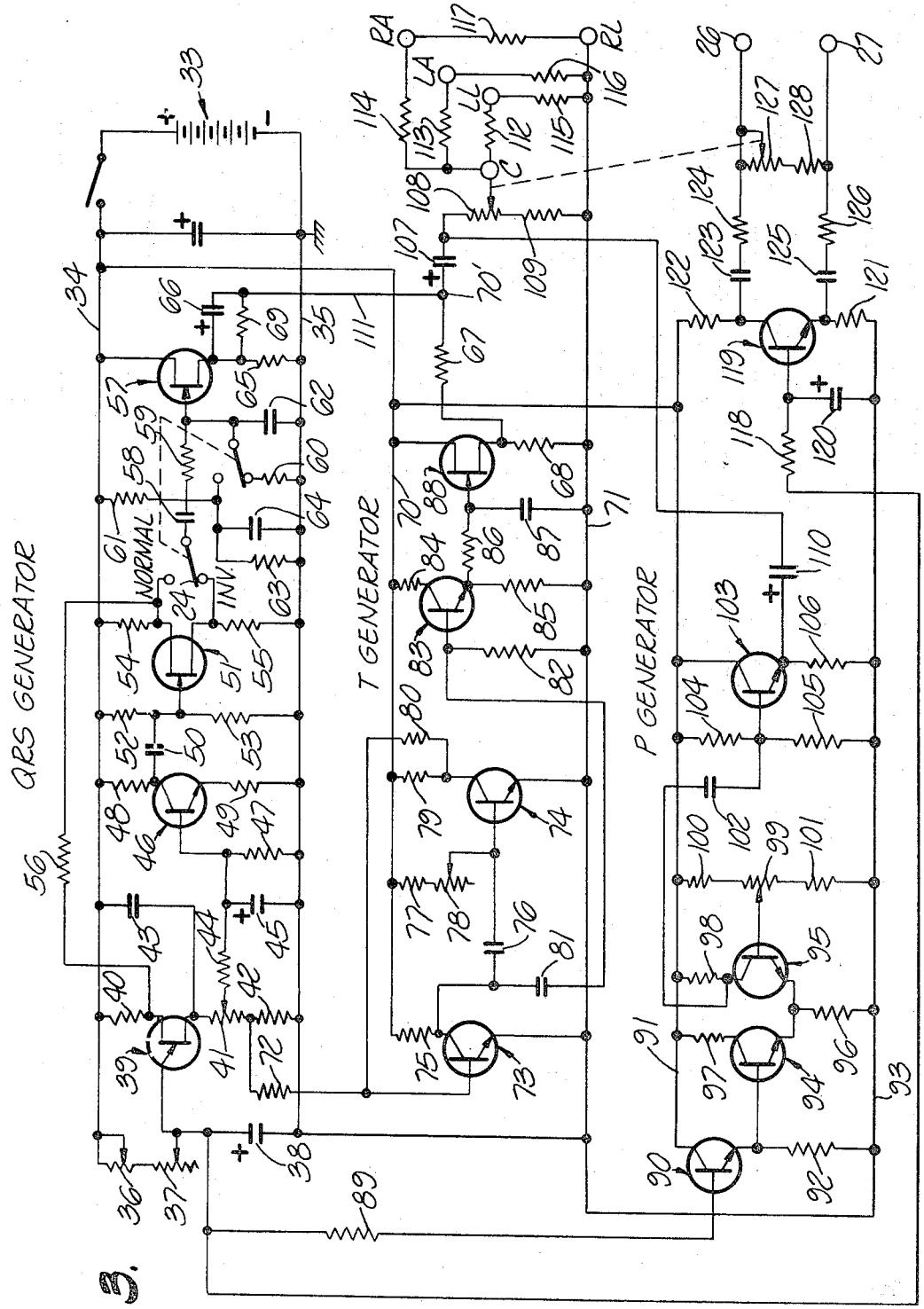
FIG. 3 is a circuit schematic of the apparatus of FIGS. 1 and 2 for generating ECG and aortic blood pressure signals of controlled characteristics.

Turning now to the drawings and particularly FIG. 1, the apparatus of the invention is identified generally as at 10 and is seen to comprise an operating panel 11, with various switches and adjustment knobs, that faces angularly upward. Connection from the apparatus 10 to a cathode-ray type presentation equipment 12, such as an oscilloscope, is accomplished via cabling 13.

An ECG signal 14 is depicted on the equipment 12 and typically includes a QRS pulse 15, P and T pulses 16 and 17, respectively. The particular representation of the ECG signal shown is merely typical and it is to be understood that the relative magnitudes of the component waves and location on the abscissa relative to one another can vary considerably, depending upon the particular physiological condition of the heart of the individual being examined, as well as the particular physical condition of the individual otherwise at the time he is being examined. Also, it is known that the heart can malfunction for very short periods of time and then quickly return to normal producing an ECG wave train where the greater majority of the waves will be the same (normal) and only a few will be changed. These signals corresponding to short time malfunction are frequently referred to as arrhythmias.

In addition, the equipment 12 is illustrated with a further presentation of an aortic blood pulse 18, which is representative of blood pressure within the aorta.

As shown in FIG. 2, the operating panel 11 adjacent its upper edge includes rate and gain controls 19 and 20. By simple manipulation of these controls, the rate and amplitude (gain) of the entire composite output ECG and aortic blood pressure signals may be modified. Adjustment of P WAVE control 21 shifts the P pulse along the viewing X-axis with respect to the QRS and T waves of the ECG signal. Similarly, the T WAVE control 22 positions the T WAVE along the X-axis. Individual amplitude control of the QRS wave is provided by the QRS AMP control 23, and inversion of the QRS wave with respect to the P and T waves is under the selective control of switch 24. Overall operation of the equipment is initiated and terminated by power switch 25.

A pair of female plugs 26 and 27, and further identified as AORTIC B.P., serve as output terminals for aortic blood pressure signals with rate and gain control provided by controls 19 and 20.

Along the lower margin of the control panel are arranged five female plugs 28–32, and additionally identified in FIG. 2, from left to right as RL (right leg), RA (right arm), C (chest), LA (left arm) and LL (left leg). As the designations imply, ECG signals obtained from the different plugs are modified to simulate signals taken from the respectively identified parts of the anatomy.

The cabling 13 is provided with appropriate dimensional male jack plugs for mating connection with any of the plugs 26–32.

With reference now to the circuital aspects of the invention and FIG. 3 of the drawings, the circuit may be considered for the present description as comprising four major parts: a QRS GENERATOR; a T GENERATOR; a P GENERATOR; and an AORTIC BLOOD PRESSURE SIMULATOR. Common power for the entire circuit apparatus is provided by a battery 33 under the selective control of power switch 25 as was indicated above.

Power to the QRS GENERATOR distributed via leads 34 and 35 is applied across an RC charging network consisting of resistor 36, rate control resistor 37 (adjustable by control 19) and capacitor 38. The position of the resistor 37 slidewire determines the time constant and thus the triggering time of the unijunction transistor 39. On triggering of transistor 39, the capacitor 38 is discharged, and the charge discharge cycle is repeated forming a sawtooth wave at the common connection point of resistor 37 and capacitor 38.

The other electrodes of the unijunction transistor are connected to power leads 34 and 35 via resistor 40 and serially related resistors 41 and 42, respectively. At the time of triggering of transistor 39, a positive going pulse is generated across resistors 41 and 42, the amplitude of which pulse is dependent upon the setting of the slidewire on resistor 41. A high-frequency bypass capacitor 43 interrelates transistor 39 electrode and lead 34.

Resistor 44 and capacitor 45 form an integrating network to give desired pulse width to the signal applied to the base of transistor 46. Resistor 47 sets the bias for the base of this transistor. Resistor 48 interconnects the transistor collector with lead 34 and serves as a load, while resistor 49 relating the emitter to lead 35 sets the gain for the transistor.

Capacitor 50 couples the signal output at the collector of transistor 46 to the gate of field effect transistor 51. Resistors 52 and 53 bias the FET. The source electrode is connected to lead 34 via load resistor 54 across which the FET develops a positive going signal when triggered. At the same time, a negative going signal is produced across resistor 55 which interconnects the FET drain and lead 35.

At the time of firing of transistor 39 a negative going pulse forms across resistor 40 which is coupled through resistor 56 to the FET source electrode. It is this negative going signal which corresponds to the Q wave of the QRS complex.

The QRS switch 24, a double-pole, double-throw switch, selects the desired polarity of the QRS wave and couples to the gate of a further FET 57 via capacitor 58 and resistor 59. In the Normal position, resistors 60 and 61 set the bias for the transistor 57, while capacitor 62 bypasses unwanted signals. For the Inverted position of the switch, resistor 63 provides bias for transistor 57 and the capacitor 64 acts as a bypass. Resistor 65 is the source follower load. Capacitor 66 in conjunction with resistors 67 and 68 form a differentiation network to generate the desired S wave. Resistor 69 fixes the S wave amplitude at a desired predetermined magnitude.

The QRS GENERATOR provides a QRS wave to terminal 70 which is summed with the P and T waves in a manner to be described later herein.

Source power to the T GENERATOR is provided from leads 34 and 35 of the QRS GENERATOR via leads 70 and 71, respectively. A positive going pulse generated when transistor 39 is triggered is taken off the common point of resistors 41 and 42 and transmitted via resistor 72 to the base of a transistor 73, the latter transistor co-acting with transistor 74 and interconnecting circuit elements to form a monostable multivibrator or so-called one-shot multivibrator. The collector of transistor 73 is interconnected with power leads 70 by resistor 75, and its emitter is directly connected to lead 71. The collector of transistor 73 is interconnected to the base of transistor 74 through capacitor 76, which base is also connected through a series resistant circuit of resistor 77 and selectively variable resistor 78 to the power lead 70. Resistor 78 can be adjusted by the T wave control 22 to vary the RC constant of resistors 77, 78 and capacitor 76, thereby modifying the pulse width output of the multivibrator and thus the time position or location of the T wave along the X-axis when presented on a cathode-ray tube. Resistor 79 is the load for transistor 74 and resistor 80 provides feedback to transistor 73 to form a monostable multivibrator.

The one-shot pulse generated by the multivibrator is differentiated by capacitor 81 and resistor 82 before being applied to the base of transistor 83. The collector of transistor 83 is interconnected with lead 70 through resistor 84 and its emitter is biased through resistor 85 connected to lead 71. Transistor 83 acts as a clipper to remove all portions of the pulse generated by the multivibrator (transistors 73 and 74) and the differentiator capacitor 81 and resistor 82 except the final overshoot which has the desired general form and shape of a T wave. An integrator circuit comprising resistor 86 and capacitor 87 shapes the T wave to desired proportions and presents the so-shaped wave to the gate of a field effect transistor 88 acting as a source follower, the drain of which is connected to lead 70 and the source is connected via resistor 68 to lead 71. There is, accordingly, obtained at the source electrode of FET 88 a T wave signal which can be selectively positioned along the X-axis by manipulation of the control 22 (resistor 78).

Although the T wave generated in the present case is only illustrated as individually modifiable as to position along the X-axis for presentation, as an alternative, resistor 75 can be made selectively variable which would then permit the provision of a T wave also of individually adjustable amplitude thereby providing additional flexibility.

The sawtooth wave available at the common point of resistor 37 and capacitor 38 is inserted through resistor 89 to the base of transistor 90 having its collector connected to lead 91 that is common with power source leads 34 and 70. The emitter of the transistor 90 is connected through resistor 92 to power lead 93 which is common with power leads 71 and 35. Transistor 90 is an emitter follower which, by virtue of its high input impedance, prevents loading of the DRS circuit. Transistors 94 and 95 have their emitters connected in common and thence to power lead 93 through resistor 96. The collectors of these transistors are powered by lead 91 through resistors 97 and 98, respectively. The base of transistor 95 is connected to the slidewire terminal of a variable resistor 99, adjustable by control 21, which resistor is serially related with resistors 100 and 101 shunted across leads 91 and 93. The transistors 94 and 95 function as a comparator so that adjustment of the P wave control 21 so biases the base of transistor 95 that a signal is made available at the collector of that transistor only at that time at which the same value of bias occurs on the sawtooth wave form presented to the base of the emitter follower 90. In this manner, the time of occurrence and thus the position of the P wavealong the X-axis when presented on a cathode-ray tube can be determined by simple adjustment of control 21.

Output of the comparator is taken at the collector of the transistor 95 and fed through a capacitor 102 to the base of transistor 103 also interconnected to power leads 91 and 93 through voltage divider resistors 104 and 105, respectively. The capacitor 102 and resistor 105 also act as differentiator to shape the pulse input to transistor 103. The collector of transistor 103 is connected directly to lead 91 and its emitter is connected through a resistor 106 to lead 93. It is the function of transistor 103 and associated circuitry to clip and shape the pulse output of the comparator in a manner similar to that accomplished by transistor 83 in the T GENERATOR.

Although the amplitude of the P wave generated by the P GENERATOR is in the described embodiment under the control of the gain control 20 which simultaneously varies the QRS and T wave amplitude as well, it is within the spirit of the present invention that resistor 98 be made selectively variable, adjustment of which would provide separate control of the P wave amplitude.

The signal outputs from the QRS, T and P GENERATORS are combined to provide a composite signal which is conventionally referred to as an ECG (or EKG) signal. More particularly, the T wave available at the source electrode of transistor 88 is fed through resistor 67 and capacitor 107 to a slidewire resistance potentiometer 108 and fixed resistor 109. The P wave is taken from the emitter of transistor 103, fed through capacitor 110 to the common point of capacitor 107 and resistor 108. The QRS signal is taken from the common point of capacitor 66 and resistor 69 and interconnected via lead 111 to the common point of resistor 67 and capacitor 107. The composite ECG signal, including QRS, P and T waves, is provided via the slidewire terminal of the potentiometer 108 to various voltage divider resistance circuits formed from the resistors 112–117 to the female plugs RA, LA, LL, RL, and C, representative of the different locations on the human anatomy at which the ECG signal is considered as having been taken as has already been described. The potentiometer 108 is connected to the gain control knob 20 and provides overall control of amplitude of all components of the composite ECG signal.

Initiation of the AORTIC BLOOD PRESSURE SIMULATOR is provided by the sawtooth output signal available at the common point of resistor 37 and capacitor 38, which signal is fed through resistor 118 to the base of transistor 119. The resistor 118 and capacitor 120 function to integrate or round off the sawtooth form, making it generally of the desired shape as depicted at 18 in FIG. 1. The emitter of the transistor 119 is connected to the line 93 through resistor 121 while the collector is related to lead 91 through resistor 122. Output from the transistor 119 is provided to the terminal 26 via capacitor 123 and resistor 124, and to terminal 27 via capacitor 125 and resistor 126. A selectively variable resistor 127 arranged in series with a fixed value resistor 128 is shunted across the terminals 26 and 27, with the setting on the resistor 127 being provided by a slidewire which is ganged for common operation with the slidewire for resistor 108. Accordingly, the output available at 26 and 27 is a cyclic train of pulses of the appearance as shown in FIG. 1, where the amplitude is under the control of gain control 20. As a variation, the slidewire for resistor 127 could be provided with a separate control whereby the AORTIC BLOOD PRESSURE could be modified individually from the ECG signal.

Although only one specific embodiment of the present invention has been described and illustrated herein, many changes and modifications will, of course, suggest themselves to those skilled in the art. This single embodiment has been selected for this disclosure for the purpose of illustration only. The present invention, therefore, should not be limited to the embodiment so selected, the true scope of the invention being defined only in the appended claims.

What is claimed is:

1. Apparatus for providing a simulated visual representation of heart action, comprising:
   a first circuit for generating an electric signal in the shape of a QRS wave;
   a second circuit for generating an electric signal in the shape of a T wave;
   a third circuit for generating an electric signal in the shape of a P wave;
   a fourth circuit for generating an electric signal in the shape of an aortic blood pressure wave;
   a summation circuit connected to receive the signals from the first, second and third circuits and provide a single ECG composite wave signal; and
   display means selectively connectable to said summation and fourth circuits for providing a common visual representation of the ECG and aortic blood pressure signals.

2. Apparatus as in claim 1, in which the second and third circuits include further means for selectively and individually varying the time of occurrence of the signals produced by said circuits.

3. Apparatus as in claim 1, in which the first circuit means includes further means for selectively reversing the polarity of the QRS wave signal.

4. Apparatus as in claim 1, in which the summation circuit further includes a prescribed plurality of attenuation networks connected to receive the ECG signals and provide a corresponding plurality of so attenuated signals representative of simulated ECG signals taken at different portions of the anatomy.

5. Apparatus as in claim 4, in which the fourth circuit includes further means for selectively varying the amplitude of the aortic blood pressure signal.

6. Apparatus as in claim 5, in which the selective varying means is ganged for common operation with a further means for varying the ECG signal output of the summation circuit.

7. In apparatus for generating a simulated ECG signal including:
   an RC charge network of predeterminedly variable time constant;
   a first pulse generating circuit connected to the charge network and triggered on discharge thereof to form a pulse train, each pulse wave of which is of the general shape of a QRS wave;
   a second pulse generating circuit connected to the charge network and triggered thereby to form a second pulse train, each pulse wave of which has the general shape of a P wave;

a third pulse generating circuit connected to the charge network and triggered thereby to form a third train of pulses, each one of which has the general shape of a T wave; and means for the pulse train outputs of the first, second and third pulse generating circuits to provide a composite pulse train of ECG pulses.

References Cited

UNITED STATES PATENTS

| | | | | |
|---|---|---|---|---|
| 3,149,492 | 9/1964 | Weinberg | 128— | 2.05X |
| 3,384,981 | 5/1968 | Baessler et al. | 35— | 17 |

HARLAND S. SKOGQUIST, Primary Examiner